Patented Feb. 2, 1932

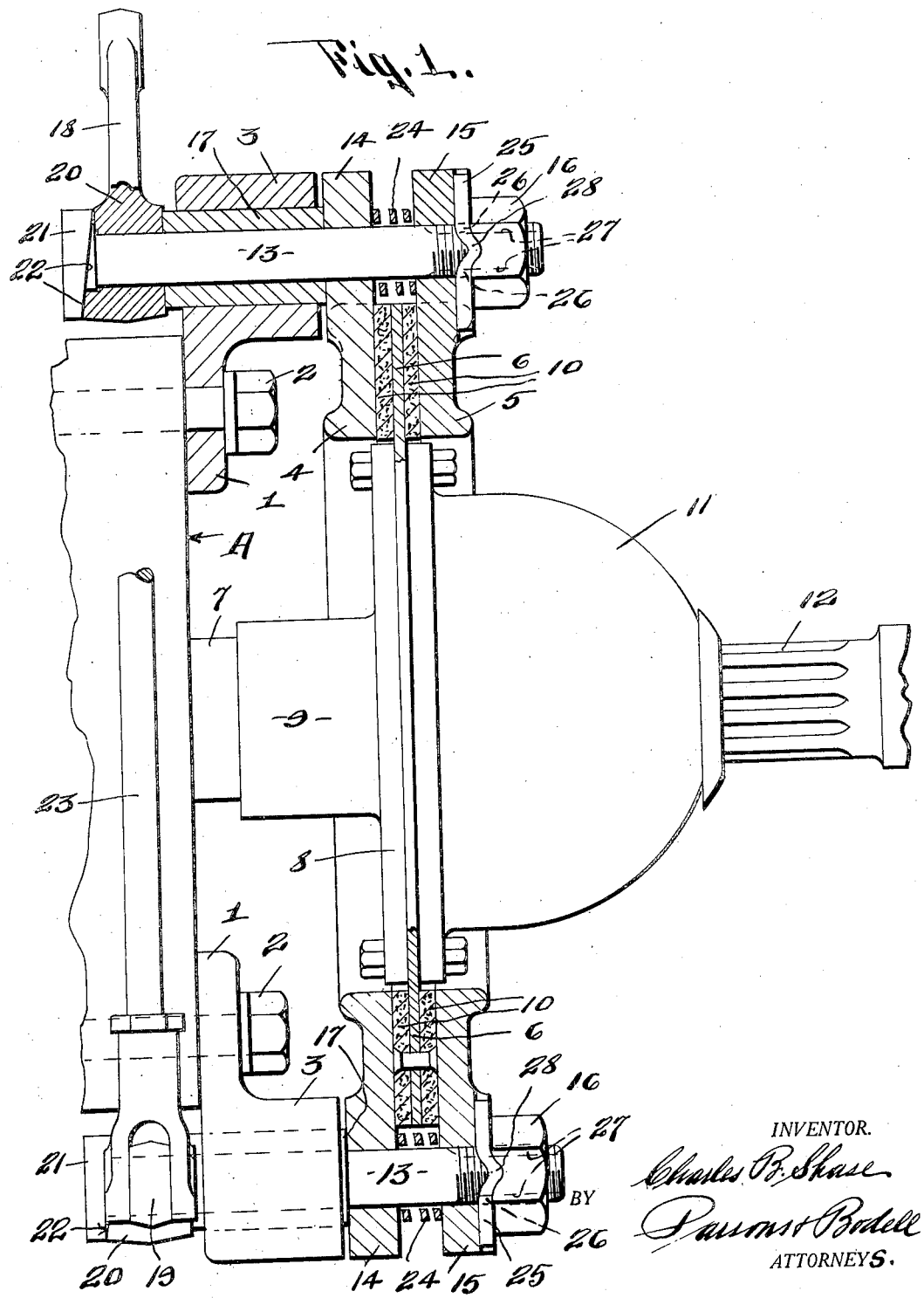

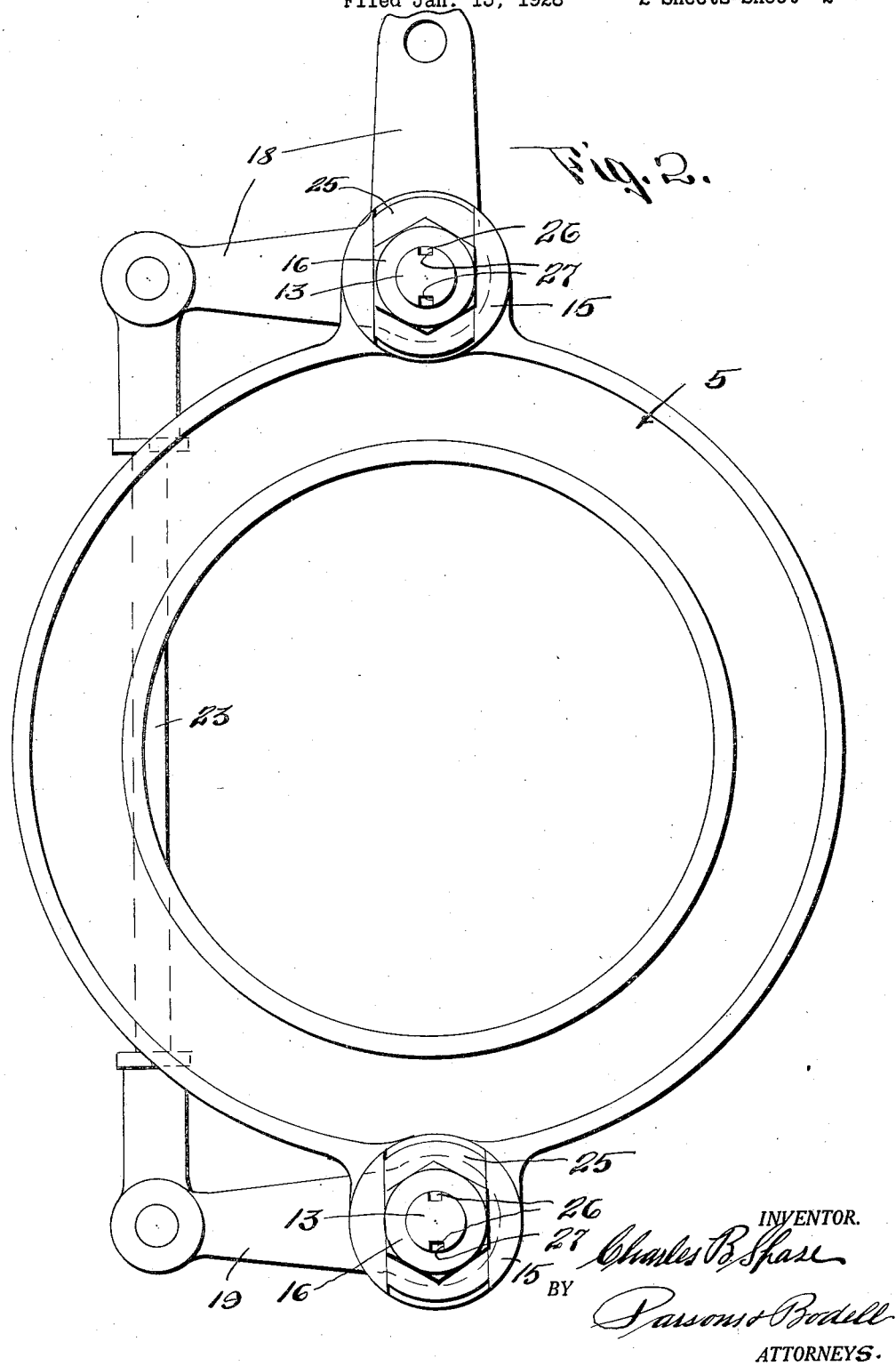

1,843,490

UNITED STATES PATENT OFFICE

CHARLES B. SPASE, OF SYRACUSE, NEW YORK, ASSIGNOR TO BROWN-LIPE GEAR COMPANY, OF SYRACUSE, NEW YORK, A CORPORATION OF NEW YORK

DISK BRAKE MECHANISM

Application filed January 13, 1928. Serial No. 246,607.

This invention relates to brake mechanism and has for its object, a particularly simple and efficient disk brake particularly applicable for use in connection with the transmission shaft or the propeller shaft of motor vehicles.

The invention consists in the novel features and in the combinations and constructions hereinafter set forth and claimed.

In describing this invention, reference is had to the accompanying drawings in which like characters designate corresponding parts in all the views.

Figure 1 is a fragmentary sectional view of this brake mechanism.

Figure 2 is an end view of parts seen in Figure 1, parts being omitted.

This brake construction comprises generally, supporting means, opposing pressure rings held from rotary movement, a rotatable friction disk interposed between the rings and connected to the driven member or shaft to be retarded and means for effecting relative axial movement of the rings toward and from each other to compress the friction disk, said means coacting with the rings at a plurality of spaced apart points.

The brake mechanism may be supported in any suitable manner and that here shown is designed to be mounted upon the rear wall A of the casing of a change speed transmission gearing and it is supported on such wall A by supports as brackets 1 secured to such wall as by screws 2, each bracket having bearings or hubs 3.

4 and 5 are opposing non-rotatable pressure rings, the ring 4 being located adjacent the ends of the bearings 3.

6 designates the intermediate rotatable friction disk which is usually of steel and rotatable with the shaft 7 of the transmission gearing, it being usually connected indirectly to the shaft by being mounted upon or secured to the universal joint section 8 having a hub 9 mounted on the rear end of said shaft. Friction facing disks 10 are mounted upon the outer sides of the steel disk 6 to coact with the rings 4, 5 which are metal.

The universal joint is of the standard construction which has been used for many years in automobile use. It will be noted that as the section 8 is secured to the transmission shaft 7, the section has no angular movement and accordingly as the disk 6 is bolted between the section 8 and the housing 11 of the universal joint, it likewise has no angular movement.

Preferably, both pressure rings 4 and 5 are shiftable axially, the means for shifting the rings 4, 5 axially comprising a plurality of endwise movable rods 13 extending through the bearings 3 and the rings 4, 5, each rod having a fixed abutment thrusting against the outer face of the ring 5, slidable abutments within the bearings 3 thrusting against the rings 4 and means as levers mounted on the rods to rotate about the same, the levers having hubs which thrust against heads on the rods and against the ends of the slidable abutments, the hubs of the levers and the heads on the rods having coacting cam faces.

13 designates the rods which extend through the disks 4, 5 beyond the outer circle of the intermediate disk and as here shown, extend through radial projections or ears 14, 15 on the rings 4, 5. There are preferably two rods 13 located diametrically opposite each other. The abutments thrusting against the outer face of the ring 5 are here shown as nuts 16 threading on the rods. The sliding abutments which thrust against the ring 4 are sleeves 17 on the rods 13, the sleeves being located in the bearings 3.

18 and 19 designate the operating levers having hubs 20 on the rods 13, the levers being movable about the rod and also being slidably mounted thereon to permit the rods and the levers to have relative endwise movement.

21 are heads on the ends of the rods adjacent the hubs 20, the heads and the hubs having coacting cam faces 22 whereby rotative movement of the levers moves the rods and the levers endwise in opposite directions. The lever 18 is a bell crank lever and one arm thereof is connected by a link 23 to the lever 19 so that the rods 13 are operated simultaneously and the pressure applied substantially equally throughout the rings 4, 5. To effect a quick release of the brake, springs 24 are provided for effecting the separation of the rings 4, 5 and disk 6. The springs 24 are here illustrated as encircling the rods 13 and thrusting in opposite directions against the rings 4, 5.

In order to hold the abutments or nuts 16 in any adjusted position, it being understood that the nuts are adjustable to take up for wear of the friction faces, a lock washer 25 is provided for each rod, this lock washer being angular and seating in a recess in the corresponding lug 15 of the disk 6 and having internal tongues 26 which fit into grooves 27 in the threaded end of the rods 13, the washer also having a cam projection 28 which fits a corresponding depression in the nut 16. Obviously, the washers hold the rods 13 from turning and also hold the nuts 16 from unintentional turning. When adjustment is required, the nut can be turned and the depression in the nut will ride or ratchet over the projection 28 and in so doing, moves the ring 5 inwardly. It can be given a half turn when the depressions will again register with the projections, the nut advancing during the half turn an amount dependent upon the pitch of the thread.

In operation, upon actuating the lever 18 by any suitable means as a hand lever or a pedal, the rods 13 will be moved endwise compressing the disks 4, 5 toward each other and applying a braking action to the intermediate disk 6 which is rotating with the shaft 12 and when the force applied to the lever 18 is released, the lever 18 will be returned to its normal position under the influence of the usual spring usually attached to brake levers, and the springs 24 will quickly separate the rings 4, 5 and relieve the braking action on the interposed disk 6.

What I claim is:

The combination with a transmission shaft having a universal joint provided with a casing having opposing sections clamped together, of a brake comprising a disk having its inner margin clamped between the sections of the casing, whereby the disk is held from axial movement, opposing pressure rings mounted on opposite sides of the disk and movable toward and from the same, means tending to separate the pressure rings from the disk and operator-operated means for moving the pressure rings simultaneously toward opposite sides of the disk.

In testimony whereof I have hereunto signed my name at Syracuse, in the county of Onondaga and State of New York, this 18th day of December, 1927.

CHARLES B. SPASE.